(12) United States Patent
Löffler (10) Patent No.: US 12,104,586 B2
(45) Date of Patent: Oct. 1, 2024

(54) HIGH-PRESSURE COMPRESSOR AND SYSTEM WITH A HIGH-PRESSURE COMPRESSOR

(71) Applicant: Kyros Hydrogen Solutions GmbH, Föritztal (DE)

(72) Inventor: Joachim Löffler, Föritztal (DE)

(73) Assignee: Kyros Hydrogen Solutions GmbH, Föritztal (DE)

( * ) Notice: Subject to any disclaimer, the term of this patent is extended or adjusted under 35 U.S.C. 154(b) by 2 days.

(21) Appl. No.: 17/948,729

(22) Filed: Sep. 20, 2022

(65) Prior Publication Data

US 2023/0102498 A1 Mar. 30, 2023

(30) Foreign Application Priority Data

Sep. 28, 2021 (DE) ...................... 10 2021 125 046.3

(51) Int. Cl.
*F04B 43/02* (2006.01)
(52) U.S. Cl.
CPC .................................... *F04B 43/02* (2013.01)
(58) Field of Classification Search
CPC ........................................................ F04B 43/02
See application file for complete search history.

(56) References Cited

U.S. PATENT DOCUMENTS

| 1,963,993 | A | 6/1934 | Hendriks et al. |
| 2,245,546 | A | 6/1941 | McMullen et al. |
| 2,869,468 | A | 1/1959 | Browne |
| 3,062,153 | A | 11/1962 | Losey |
| 3,391,963 | A | 7/1968 | Weeks |
| 3,620,652 | A * | 11/1971 | Jaspers ................. F04B 39/042 74/18.2 |

(Continued)

FOREIGN PATENT DOCUMENTS

| CN | 105570098 | 5/2016 |
| CN | 109441787 | 3/2019 |

(Continued)

OTHER PUBLICATIONS

Zou et al., "Electrochemical Compression Technologies for High-Pressure Hydrogen: Current Status, Challenges and Perspective", Electrochemical Energy Reviews, vol. 3, Aug. 7, 2020, pp. 690-729.

*Primary Examiner* — Kevin R Barss
(74) *Attorney, Agent, or Firm* — Dority & Manning, P.A.

(57) ABSTRACT

A high-pressure compressor and a system including a high-pressure compressor are described, wherein the high-pressure compressor includes at least one pressure container surrounding at least one media chamber and at least one compressor assembly. A diaphragm separates the at least one media chamber from at least one compressor chamber. The diaphragm extends along the at least one contour bar, which is connected to the at least one pressure container. The at least one contour bar is provided with at least one first connection and bores for supplying and/or discharging a gas or gas mixture. The diaphragm is fixed to the at least one contour bar by means of clamping pieces. The at least one pressure container has at least one second connection, which opens into the at least one media chamber and via which a medium can be introduced into and/or discharged from the at least one media chamber.

11 Claims, 7 Drawing Sheets

(56) References Cited

U.S. PATENT DOCUMENTS

| | | |
|---|---|---|
| 2008/0216898 A1 | 9/2008 | Grant et al. |
| 2008/0314313 A1 | 12/2008 | Kazkaz et al. |
| 2009/0269627 A1 | 10/2009 | Zhang et al. |
| 2013/0315818 A1 | 11/2013 | Roy |

FOREIGN PATENT DOCUMENTS

| | | |
|---|---|---|
| CN | 110454368 | 11/2019 |
| DE | 102016004420 | 10/2017 |
| DE | 102019129430 | 5/2021 |
| DE | 102019129433 | 5/2021 |
| DE | 102019129434 | 5/2021 |
| DE | 102019129437 | 5/2021 |
| FR | 877859 | 1/1943 |
| FR | 2085490 | 12/1971 |
| KR | 20160090036 | 7/2016 |

\* cited by examiner

HIGH-PRESSURE COMPRESSOR AND SYSTEM WITH A HIGH-PRESSURE COMPRESSOR

PRIORITY CLAIM

The present application is based on and claims priority to German Application DE102021125046.3, entitled "High-pressure compressor and system with a high-pressure compressor," having a filing date of Sep. 28, 2021 which is incorporated by reference herein.

FIELD

The present disclosure relates to a high-pressure compressor and a system with a high-pressure compressor which are designed for the compression of a gas or gas mixture.

BACKGROUND

Gases and gas mixtures with high pressures are required for various applications. In some cases, the pressures are in the range of several hundred or even over 1000 bar. For example, gases or gas mixtures with several 100 bar are required for applications in the field of energy-generating facilities or for mobile applications. Hydrogen, for example, is usually stored in containers at a pressure of around 300 bar. Difficulties arise in compressing the gases or gas mixtures, with conventional solutions having disadvantages.

SUMMARY

One example aspect of the present disclosure is directed to a high-pressure compressor for compressing a gas or gas mixture. The compressor includes at least one pressure container surrounding at least one media chamber and at least one compressor assembly. The at least one compressor assembly includes at least one contour bar and at least one diaphragm, which separates the at least one media chamber from at least one compressor chamber. The at least one contour bar has at least one first connection for the supply or discharge of a gas or gas mixture, which opens into the at least one compressor chamber. The at least one pressure container has at least one second connection for the supply or discharge of a medium, which opens into the at least one media chamber. The at least one diaphragm is deformable for compressing the gas or gas mixture which can be introduced into the at least one compressor chamber by introducing a medium into the at least one media chamber.

BRIEF DESCRIPTION OF THE FIGURES

In the figures shows.

In the drawings, elements provided with the same reference signs essentially correspond to each other, unless otherwise indicated.

Furthermore, components are not shown and described which are not essential for understanding the technical teachings disclosed herein. Furthermore, the reference signs are not repeated for all elements already introduced and shown, provided that the elements themselves and their function have already been described or are known to a person skilled in the art.

DETAILED DESCRIPTION

According to the general technical understanding, "high pressure" refers to the high-pressure compression of gases and gas mixtures at a compression of 40 bar or more above atmospheric pressure.

The high-pressure compressor and system described herein can be used for high-pressure compression of combustible or oxidizing gases or gas mixtures. An example of a combustible gas is s hydrogen. An example of oxidizing gas is oxygen. Combustible or oxidizing gas mixtures may contain hydrogen and oxygen.

Known compressors for gas and gas mixtures are designed, for example, as piston compressors and have a linearly movable piston which compresses a gas or gas mixture introduced into a receiving chamber by reducing the size of the receiving chamber and thus compresses it. The compressed gas or gas mixture is then discharged and fed to an appliance.

Such piston compressors are disadvantageous in particular because, due to the moving piston, a seal must be provided to seal the piston against a wall bounding the receiving chamber. However, this seal cannot provide a complete sealing on the one hand because there is permanent movement between the components to be sealed, and is subject to high wear due to the frequent movement.

In contrast, the problem is to provide a solution for the high-pressure compression of gases and gas mixtures that both eliminates the disadvantages of the prior art and provides an alternative to the prior art that is simple in design and permits a high compression of gases and gas mixtures with a small installation space. The aim is to provide a solution for high-pressure compression that has no moving components that are primarily used for compression and are in contact with the environment.

The above-mentioned problem is solved according to examples of the present disclosure by a high-pressure compressor for compressing a gas or gas mixture, comprising a pressure container enclosing at least one media chamber and at least one compressor assembly, wherein the at least one compressor assembly consists of at least one contour bar and at least one diaphragm separating the at least one media chamber from at least one compressor chamber, and the at least one contour bar has at least one first connection for the supply and/or discharge of a gas or gas mixture, which opens into the at least one compressor chamber, the pressure container having at least one second connection for the supply and/or discharge of a medium, which opens into the at least one media chamber, wherein the at least one diaphragm is deformable for compressing the gas or gas mixture which can be introduced into the at least one compressor chamber by introducing a medium into the at least one media chamber.

In an advantageous embodiment, the high-pressure compressor is designed as a hose-diaphragm compressor and thus causes compression of the gas or gas mixture that can be introduced into the at least one media chamber by deformation of the at least one diaphragm.

Advantageously compared to piston compressors, a diaphragm compressor does not have any seals that come into contact with moving components, so that no sealing problems arise and fluid particle-free compression is achieved. This further results in the advantage that a diaphragm compressor is more wear resistant than a conventional piston compressor, since the number of moving components is lower. Another advantage is that a diaphragm compressor requires less installation space than a comparable piston compressor to achieve the same compression rate.

The high-pressure compressor is designed such that the at least one diaphragm is in contact with the at least one contour bar in an advantageous initial position. When the gas or gas mixture is introduced, the at least one diaphragm is brought into contact with the inner wall of the at least one housing sleeve of the at least one pressure container. The at least one spanned space, which is bordered by the clamping pieces, forms the at least one compressor chamber. The volume enclosed by the at least one compressor chamber is thus available for compression.

After introducing a gas or gas mixture via the at least one first connection, the supply is interrupted and the line is shut off. Compression then occurs, wherein a more incompressible medium than the gas or gas mixture to be compressed is introduced into the at least one media chamber via the at least one second connection. In an advantageous embodiment, the medium is incompressible.

As incompressible are considered liquid media with a compression modulus of at least 1.0 GPa. In an advantageous embodiment, the medium is water or hydraulic oil. In further advantageous embodiments, gases are also conceivable as a medium.

The pressure exerted on the at least one diaphragm via the medium corresponds to the pressure on the side of the gas or gas mixture, so that an essentially differential pressure-less compression is carried out within the at least one pressure container of the high-pressure compressor. In an advantageous embodiment, the substantially differential pressure-less compression allows for lower material thicknesses of the at least one diaphragm, since the diaphragm does not absorb any stresses other than compressive stresses.

During compression of the gas or gas mixture that has been introduced into the at least one compressor chamber, the pressure on the at least one diaphragm from the side of the at least one media chamber is increased by the incompressible medium, so that deformation of the at least one diaphragm in the direction of the at least one contour bar occurs, which then leads to compression of the gas or gas mixture received in the at least one compressor chamber.

The at least one diaphragm can be deformed by the incompressible medium until the at least one diaphragm is completely or almost completely in contact with the at least one contour bar. Thus, a high compression is achieved because the gas or gas mixture can be compressed by almost the entire volume of the at least one compressor chamber. Compared to known devices, a higher compression is thus achieved.

The deformation of the at least one diaphragm can be achieved by stretching the at least one diaphragm, wherein for this purpose the at least one diaphragm is appropriately designed with respect to its construction and/or internal structure so that the required deformation is achieved.

Further advantageous embodiments result from further developments defined by the subclaims.

In an advantageous embodiment, the high-pressure compressor may comprise at least one pressure container having a cylindrical cross-section.

In a further advantageous embodiment, the cross-sectional area of the at least one housing sleeve and/or the flange plates may be provided in the form of a polygon. The production of a, for example, rectangular profile is advantageous over more complex cross-sections.

In an advantageous embodiment, the at least one pressure container of the high-pressure compressor can be of multi-part design. The central part of the high-pressure compressor is formed by the at least one housing sleeve, which is bordered by flange plates attached to the end faces. To enable sealing against the environment, grooves and recesses are provided in the flange plates to position and fix the at least one housing sleeve in a sealing manner.

In a further advantageous embodiment, the flange plates can have equidistant bores along the flange plate contour outside the recesses which serve to receive the at least one housing sleeve, wherein the opposing flange plates, which are spaced apart by the at least one housing sleeve, are aligned in the assembled state in such a way that the bores are positioned congruently, so that rods, which can be bolts or threaded rods or screws, can be guided through these bores. The length of the rods is selected so that they protrude beyond the flange plates to both ends of the at least one pressure container, and the protruding ends of the rods each have a thread. Nuts and spacer discs are guided onto the ends, whereby the flange plates with the at least one housing sleeve enclose at least one media chamber in a force-locking and form-fitting as well as gas-tight manner. A direct screw connection of the flange plates to the housing sleeve can also be provided in a further embodiment of the pressure container.

The flange plates as well as the at least one housing sleeve include metal or a metal alloy or a stainless steel or a stainless steel alloy. In an advantageous embodiment, the flange plates and the at least one housing sleeve are made of a stainless steel alloy of the 316 L group.

In a further advantageous embodiment, materials such as plastics are also conceivable for manufacturing the flange plates and the at least one housing sleeve, provided that they are gas-tight and have sufficient tensile strength to withstand the internal pressure of the pressure container.

In an advantageous embodiment, one of the flange plates of the at least one pressure container may include at least one bore, wherein at least one contour bar that receives at least one compressor assembly is sealingly positioned.

In a further advantageous embodiment, the at least one pressure container can have further connections for the supply and/or discharge of a medium that serves to compress a gas or gas mixture. The at least one second connection, which may be formed as a bore, for the supply and/or discharge of a medium is located in at least one flange plate and/or the at least one housing sleeve.

The at least one compressor assembly can be arranged along at least one contour bar, wherein the at least one contour bar is connected in a gas-tight manner to a flange plate at one end region. At least one first connection is provided at this end of the at least one contour bar, which serves to supply and discharge the gas or gas mixture to be compressed. The at least one contour bar is substantially a cylindrical bar, which extends over almost the entire length of the at least one pressure container. In a further advantageous embodiment, the at least one contour bar may also have a polygon in cross-sectional profile.

Starting from the connection-side inner wall of the connection-side flange plate, the at least one contour bar can, in an advantageous embodiment, have a thread and an expanding conical area, in the center of the at least one pressure container, the at least one contour bar can have at least one concave area, towards the free end of the at least one contour bar, the latter can have in an advantageous embodiment a constricting conical area as well as a further thread. The at least one first connection, which serves to supply and/or discharge gas or gas mixture, may extend centrally, along the at least one contour bar. Along the circumference, between the widening and the constricting conical area, further bores are provided, these can start from the at least one first connection and open into the at least one compressor chamber, which is stretched over the diaphragm.

In an advantageous embodiment, the at least one contour bar can have grooves along and/or lengthwise the circumference that extend to the at least one first connection. Advantageously, the compressed gas or gas mixture can thus be better discharged from the compressor chamber.

In a further advantageous embodiment, the at least one diaphragm may be in the form of a hose section and/or a hose segment.

In an advantageous embodiment, the at least one diaphragm may be arranged on and/or at the at least one contour bar.

In an advantageous embodiment, the at least one diaphragm can extend from the widening conical area to the tapering conical area of the at least one contour bar. The at least one diaphragm is guided over cones and connected by push-on clamping pieces, which have a bore complementary to the cones of the at least one contour bar. The clamping pieces are arranged mirror-symmetrically on the at least one contour bar. With the aid of clamping nuts, which are provided on the threads on the inner edge areas of the at least one pressure container on the at least one contour bar, the clamping pieces are fixed on the at least one contour bar and a surface pressure is generated, which positions the at least one diaphragm in a force-fit and gas-tight manner.

In an advantageous embodiment of the clamping pieces and the contour bar, the surfaces can have a tooth profile or comparable to increase the force and/or form fit. In a further advantageous embodiment, needle-shaped embossments are provided on the contour bar, which pass through the at least one diaphragm in the assembled state.

To avoid abrupt cross-sectional transitions of the at least one diaphragm in the inflated state, the opposing inner end faces of the clamping pieces are provided with a circumferential chamfer.

In an advantageous embodiment, the chamfer can have radii so that the transition from the clamping piece to the inner wall of the housing sleeve is almost continuous.

In a further advantageous embodiment, the clamping pieces can also be of multi-part design.

In an advantageous embodiment, the at least one diaphragm may comprise a polymerized material. Advantageously, the at least one diaphragm comprises an elastomer such as ethylene-propylene-diene monomer or fluorocarbon rubber. Advantageously, the composition of the polymerized material has high elasticity and low fatigue as a result of load cycles.

In another advantageous embodiment, a flange plate can receive a plurality of contour bars arranged in parallel. It can also be advantageously embodied that several compressor assemblies can be arranged in series on a contour bar.

The above problem is further solved by a compressor system for high pressure compression of a gas or gas mixture, comprising at least one high-pressure compressor, a low pressure gas or gas mixture supply, a high pressure gas or gas mixture supply, a media supply and conveying means for conveying a gas or gas mixture and an incompressible medium and control means for regulating the flow of the gas or gas mixture and the incompressible medium via associated lines, wherein—the high-pressure compressor comprises at least one pressure container surrounding at least one compressor assembly and at least one media chamber, —said compressor assembly is arranged on at least one contour bar carrying at least one flexible diaphragm, said diaphragm spanning at least one compressor chamber when inflated, wherein said at least one diaphragm seals said at least one compressor chamber to said at least one media chamber, and—the high-pressure compressor has at least one first connection opening into the compressor chamber, —the at least one first connection is connected to the low pressure gas or gas mixture supply and the high pressure gas or gas mixture supply via associated lines and corresponding conveying and/or control means, so that a gas or gas mixture can be introduced from the low-pressure gas or gas mixture supply into the at least one compressor chamber and from the at least one compressor chamber into the high pressure gas or gas mixture supply, and—the high-pressure compressor comprises at least one second connection opening into the at least one media chamber, —the at least one second connection is connected to the media supply via associated lines and corresponding conveying and/or control means, so that an incompressible medium can be introduced from the media supply via the at least one second connection into the at least one media chamber and from the at least one media chamber into the media supply, —the incompressible medium can be pressurized via associated conveying and/or control means, so that a deformation of the at least one diaphragm and, via this, a compression of the gas or gas mixture received in the at least one compressor chamber can be achieved, for which purpose lines to and from the low pressure gas or gas mixture supply, the high pressure gas or gas mixture supply and the media supply can be closed via corresponding control means.

In an advantageous embodiment of the compressor system, the media circuit and the medium conducted and/or conveyed via it can be heated and/or climatized at least in the area of the at least one second connection. Advantageously, a viscosity of the incompressible medium is thus achieved in order not to generate a counterpressure on the conveying means when flowing into the at least one media chamber via the at least one second connection.

In an advantageous embodiment of the compressor system, the pressurization of the medium within the at least one medium chamber can be carried out via the conveying means, which convey the incompressible medium into the at least one medium chamber. The conveying means are designed, for example, as a piston and/or as a pump. It is particularly advantageous if a conveying means is designed as a pump, so that the piston can be completely omitted. In such an advantageous embodiment, a system without a piston can be used as a conveying and/or pressurizing means.

The system provides the capability for high pressure compression of a gas or gas mixture with at least one high-pressure compressor, through the deflection of the at least one diaphragm.

Further advantages, features and possible designs can be seen in the following figure description of a non-restrictive example of an embodiment.

Figure 1:
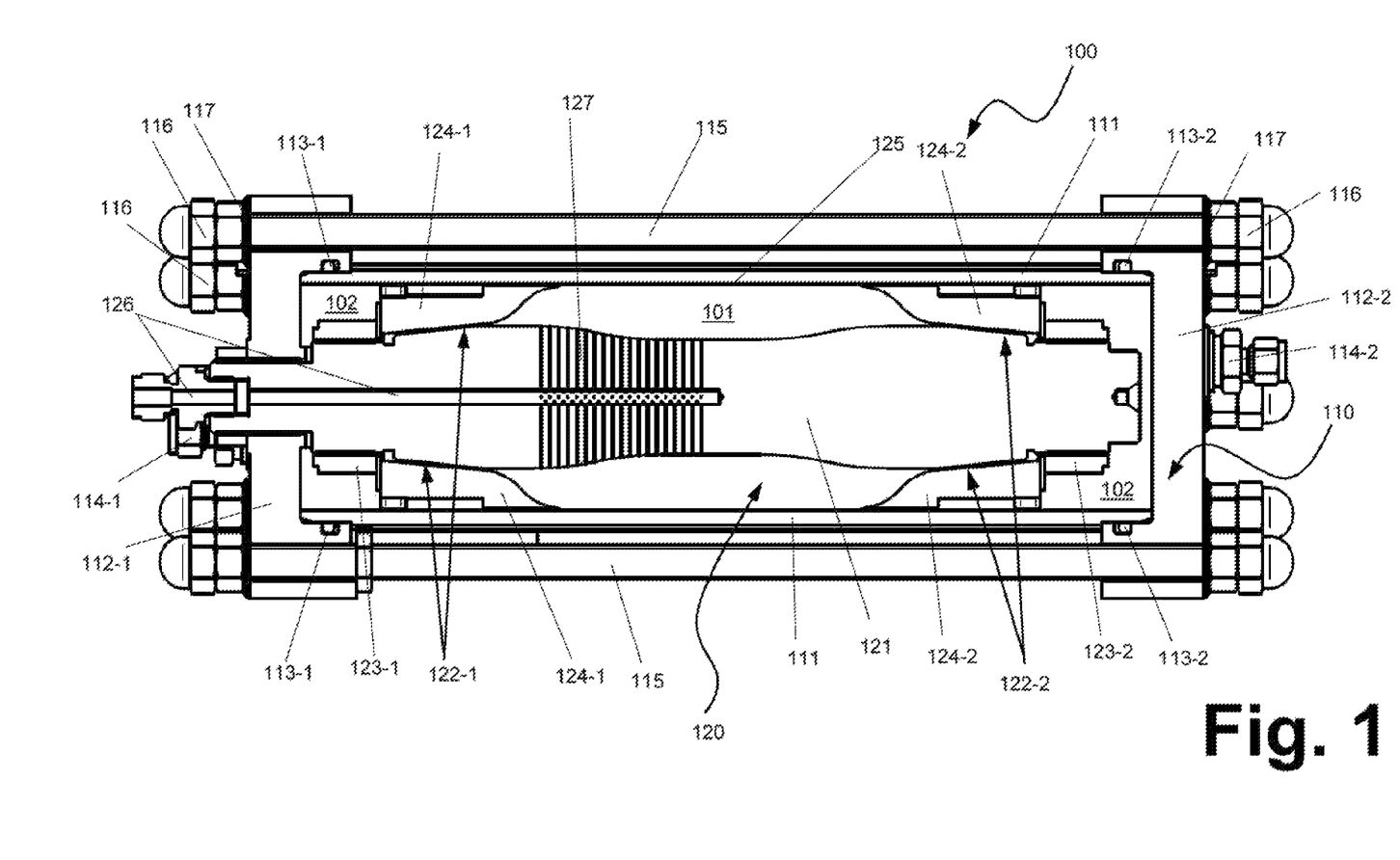
FIG. 1: a sectional view of a high-pressure compressor with a diaphragm.

FIG. 1 shows a sectional view of a high-pressure compressor 100. The high-pressure compressor 100 is used to compress a gas, such as hydrogen or other gas mixtures, and is one possible embodiment of the technical teachings disclosed herein. Thus, the embodiment shown and described below is not limiting and may have additional features disclosed herein or alternatives disclosed.

The high-pressure compressor 100 shown in FIG. 1 includes a compressor assembly 120 and a multi-piece pressure container 110 surrounding the compressor assembly 120 and a media chamber 102.

The pressure container 110 is substantially cylindrical in shape, and has two opposing flange plates 112-1, 112-2. A housing sleeve 111 is arranged between the flange plates 112-1, 112-2. In the assembled state, both flange plates have a concentric circumferential recess on the opposite sides, into which the housing sleeve 111 can be inserted in a form-fit, sealing manner. An additional seal 113-1, 113-2, for example an O-ring, is provided inside the concentric recess. Furthermore, the flange plates have equidistant bores along the flange contour outside the recess which serves to receive the housing sleeve 111. The opposing flange plates 112-1, 112-2, which are spaced apart by the housing sleeve 111, are aligned in the assembled state in such a way that the bores are positioned congruently, so that rods 115, which can be bolts, threaded rods or screws, can be guided through these bores. The length of the rods is selected so that they project beyond the flange plates 112-1, 112-2 to both ends of the pressure container 111, the projecting ends of the rods each having a thread. Nuts 116 and spacer discs 117 are guided onto the ends, whereby the flanges 112-1, 112-2 enclose a media chamber 102 with the housing sleeve 111 in a force-fit, form-fit and gas-tight manner. One of the flanges 112-1, 112-2 has a central bore wherein the contour bar 121, which receives the compressor assembly 120, is sealingly positioned. Further bores are provided on the flange plates 112-1, 112-2 for supplying a medium used to compress a gas or gas mixture. The gas or gas mixture may be, for example, hydrogen.

The flange plates 112-1, 112-2 as well as the housing sleeve are made of a 316 L group stainless steel.

The compressor assembly 120 is arranged along a contour bar 121, wherein the contour bar 121 is connected at one end area to one of the two flange plates 112-1, 112-2. At least one connection 126 is provided at this end of the contour bar 121, which serves to supply and discharge the gas or gas mixture to be compressed. The contour bar 121 is essentially a cylindrical bar which extends along substantially the entire length of the pressure container 110.

Starting from the connection-side inner wall of the flange plate 112-1, the contour bar 121 has a thread and an expanding conical area 122-1, in the center of the pressure container 110, the contour bar 121 has a concave area, towards the free end of the contour bar, it has a constricting conical area 122-2 and another thread. The connection 126, which serves to supply and discharge gas or gas mixture, is formed as a bore and extends centrally inside the contour bar 121. Further bores 127 are present along the circumference between the widening and the constricting conical areas 122-1, 122-2, these bores start from the connection 126 and open into the compressor chamber 101. The compressor chamber 101 is expanded via a diaphragm 125, FIG. 1 shows the high-pressure compressor unit 100 in an inflated state.

The diaphragm 125 is tubular, and in further embodiments, the diaphragm 125 is a tubular section or tubular segment.

The diaphragm 125 comprises a polymerized material, in an advantageous embodiment an elastomer such as ethylene-propylene-diene monomer, fluorocarbon rubber.

The diaphragm 125 extends from the widening conical area 122-1 to the tapering conical area 122-2 of the contour bar 121. The diaphragm 125 is guided over the cones 122-1, 122-2 and connected by means of push-on clamping pieces 124-1, 124-2, which have a bore complementary to the cones 122-1, 122-2 of the contour bar 121. The clamping pieces 124-1, 124-2 are arranged mirror-symmetrically on the contour bar 121. With the aid of clamping nuts 123-1, 123-2, which are provided on the threads on the inner edge areas of the pressure container 110 on the contour bar 121, the clamping pieces 124-1, 124-2 are fixed on the contour bar 121 and a surface pressure is generated, which positions the diaphragm 125 in a force-locking manner.

The diaphragm 125 extends from the widening conical area 122-1 to the tapering conical area 122-2 of the contour bar 121. The diaphragm 125 is guided over the cones 122-1, 122-2 and connected by means of push-on clamping pieces 124-1, 124-2, which have a bore complementary to the cones 122-1, 122-2 of the contour bar 121. The clamping pieces 124-1, 124-2 are arranged mirror-symmetrically on the contour bar 121. With the aid of clamping nuts 123-1, 123-2, which are provided on the threads on the inner edge areas of the pressure container 110 on the contour bar 121, the clamping pieces 124-1, 124-2 are fixed on the contour bar 121 and a surface pressure is generated, which positions the diaphragm 125 in a force-locking manner.

In an initial state, the diaphragm 125 is fully in contact with the contour bar 121 (not shown in FIG. 1). In an inflated state, the diaphragm 125 is in contact with the inner wall of the housing sleeve 111. During high pressure compression, the diaphragm 125 is deformed so that it continuously comes into contact with the contour bar 121 from a position in contact with the inner wall of the housing sleeve 111.

To avoid abrupt cross-sectional transitions of the diaphragm 125 in the inflated state, the opposing inner end faces of the sleeve-shaped clamping pieces 124-1, 124-2 are provided with a circumferential chamfer. In an advantageous embodiment, the chamfer has radii so that the transition from clamping piece 124-1, 124-2 to the inner wall of the housing sleeve is almost continuous.

The outer diameter of the sleeve-shaped clamping pieces 124-1, 124-2 is almost equal to the inner diameter of the housing sleeve 111, so that the medium used to compress the gas or gas mixture can flow into the media chamber 102, the outer surfaces of the clamping pieces 124-1, 124-2 are provided with recesses. In an advantageous embodiment of the clamping pieces 124-1, 124-2, rotationally symmetrically arranged through boreholes are also conceivable.

Thus, depending on the design of the high-pressure compressor 100 and its components, an adjustment of the compression ratio of gases or gas mixtures can be achieved. In particular, the elasticity of the diaphragm 125 is decisive for the compression. The greater the elasticity, the greater the compression.

To deform the diaphragm 125 for high-pressure compression of a gas or gas mixture introduced into the compressor chamber 101, a medium under pressure is introduced into the media chamber 102 that has a lower compressibility than the gas or gas mixture to be compressed. This ensures that the pressure across the medium s on the diaphragm 125 exerts a correspondingly high pressure on the gas or gas mixture, which is then compressed or densified. For example, water or a hydraulic oil can be used as the incompressible medium.

Description of the System

Figure 2:
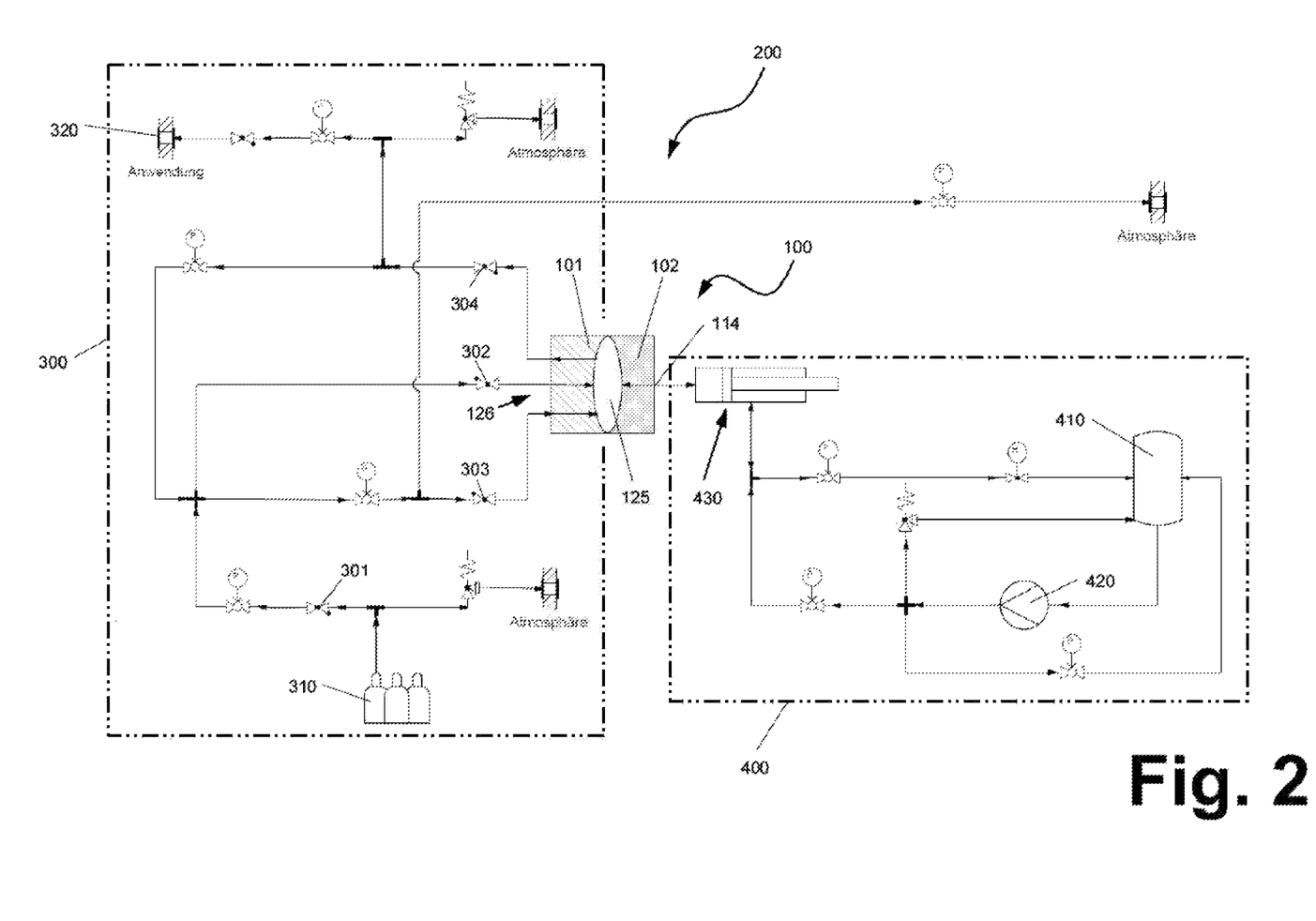
FIG. 2: different views of a first and second compressor head of the high-pressure compressor of FIG. 1.

FIG. 2 shows a schematic representation of a compressor system 200 comprising a high-pressure compressor 100 according to the embodiment of FIG. 1.

In further embodiments not shown, a compressor system 200 may also be operated with a variation of the high-pressure compressor 100 shown in FIG. 1, which falls within the technical teachings described herein. Finally, a compressor system 200 may in principle include a plurality of high pressure compressors 100 connected, for example, in parallel or in series.

In addition to the high-pressure compressor 100, the compressor system 200 includes lines and control devices, as well as valves and a piston 430, and a media supply 410 that holds a media used to compress the gas or gas mixture. The media supply 410, the piston 430, and a pump 420 are part of a media circuit 400, which in turn is part of the compressor system 200.

The compressor system 200 also has a gas or gas mixture circuit 300 which, in addition to the lines for supplying and removing the gas or gas mixture, has control devices, valves, a supply 310 in which the gas or gas mixture is stored at a relatively low pressure of at least 10 bar for high-pressure compression, and a connection to a high-pressure gas or gas mixture supply 320, the high-pressure gas or gas mixture supply 320 shown in FIG. 2 to FIG. 6 depicted high-pressure gas or gas mixture supply 320 may also be any application.

The compressor system 200 also has a gas or gas mixture circuit 300 which, in addition to the lines for supplying and discharging the gas or gas mixture, has control devices, valves, a supply 310 in which the gas or gas mixture is stored at a relatively low pressure of at least 10 bar for high pressure compression, and a connection to a high pressure gas or gas mixture supply 320, the high pressure gas or gas mixture supply 320 shown in FIG. 2 to FIG. 6 may also be an arbitrary application.

The compressor system 200 further includes pressure relief valves that allow gas to escape to atmosphere when critical, adjustable pressures in the system are exceeded. In the illustrated embodiment of the compressor system 200, compression of hydrogen as a gas occurs starting from a pressure of at least 10 bar in the low pressure gas or gas mixture supply 310 to about 1200 bar, so that the high pressure gas or gas mixture supply 320, is provided with the gas or gas mixture at a pressure of about 1200 bar.

Figure 3:
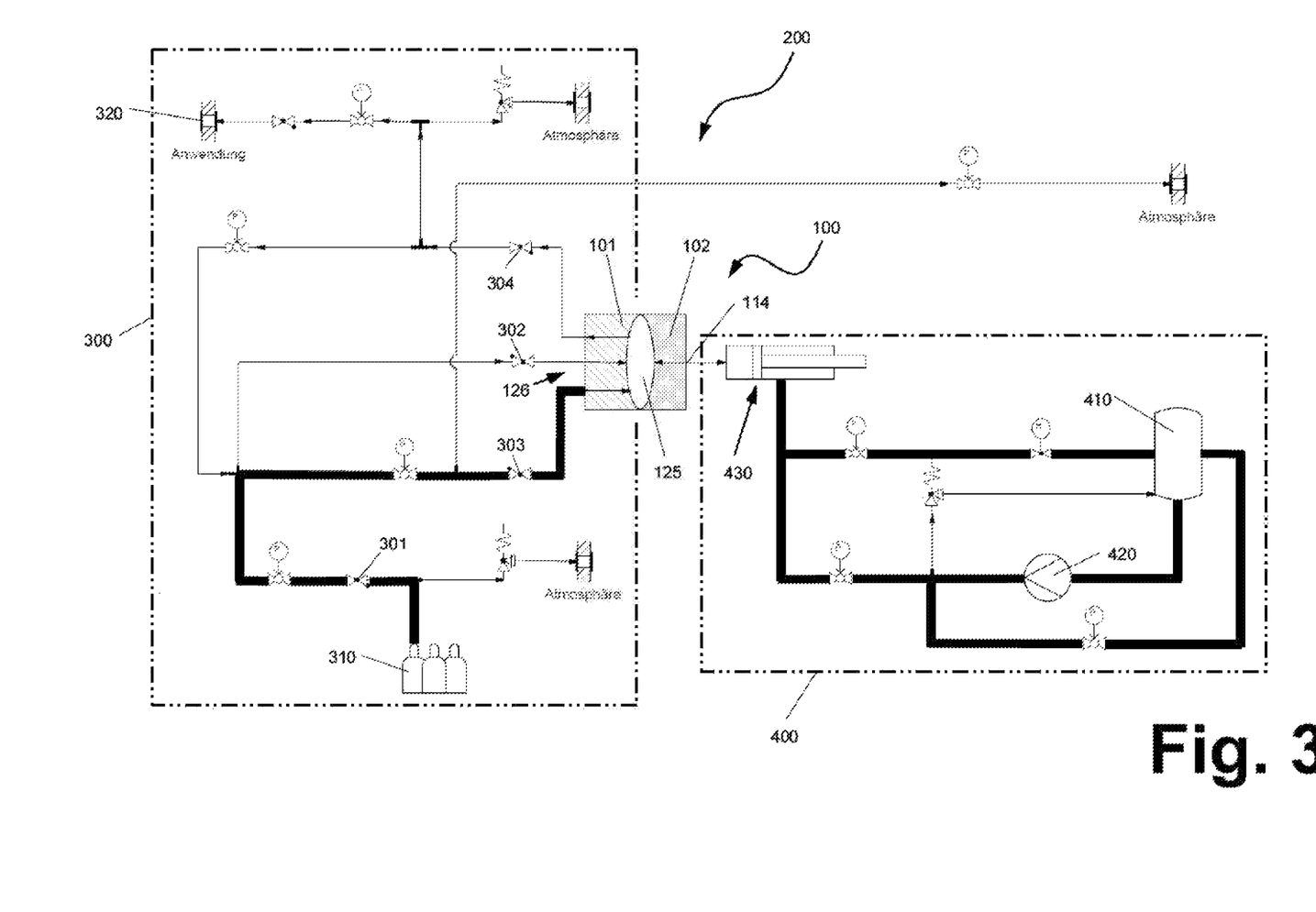
FIG. 3-6: a schematic representation of the process sequence of a cycle of high pressure compression in the compressor system according to FIG. 2.
Figure 4:
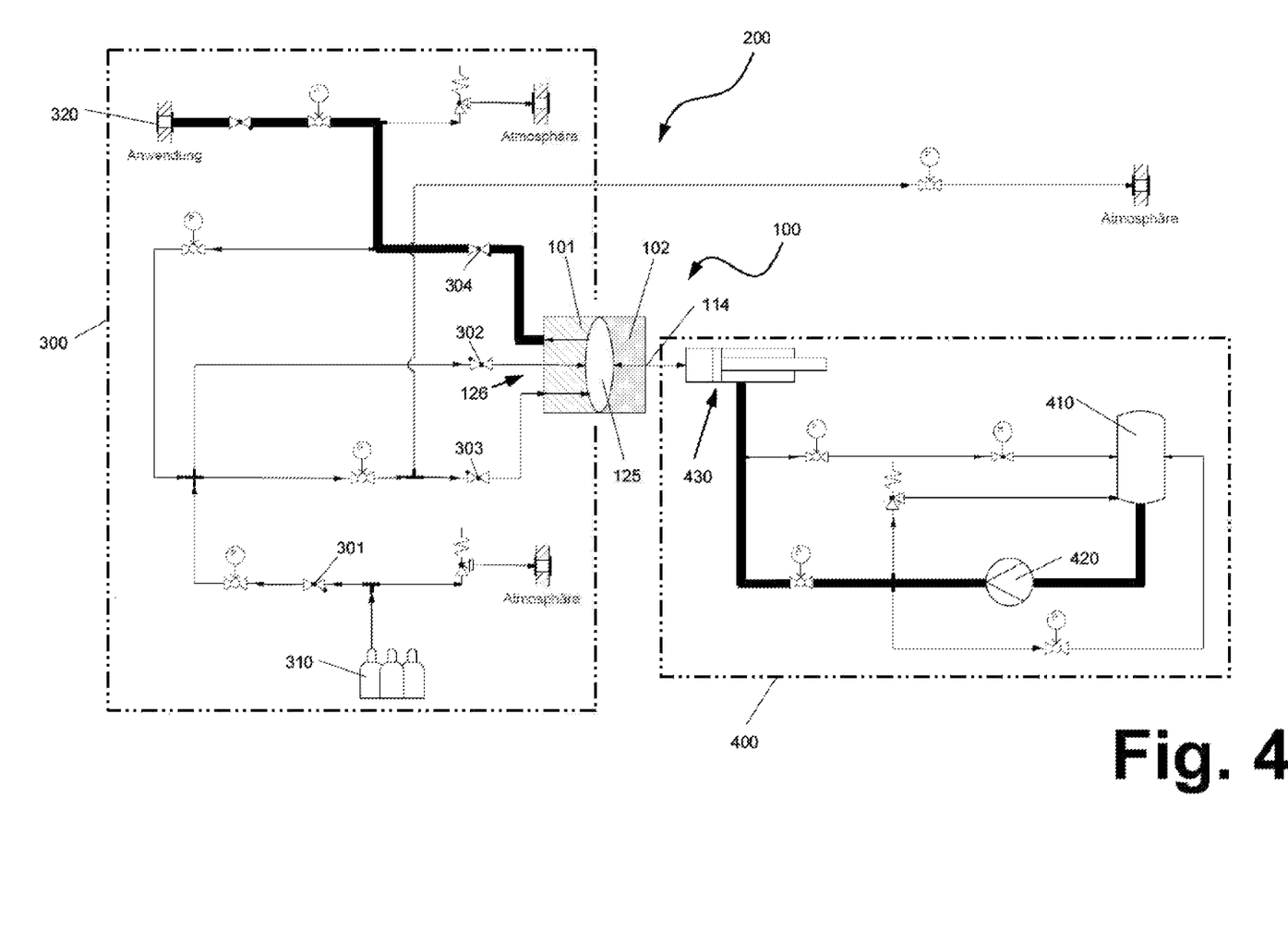
Figure 5:
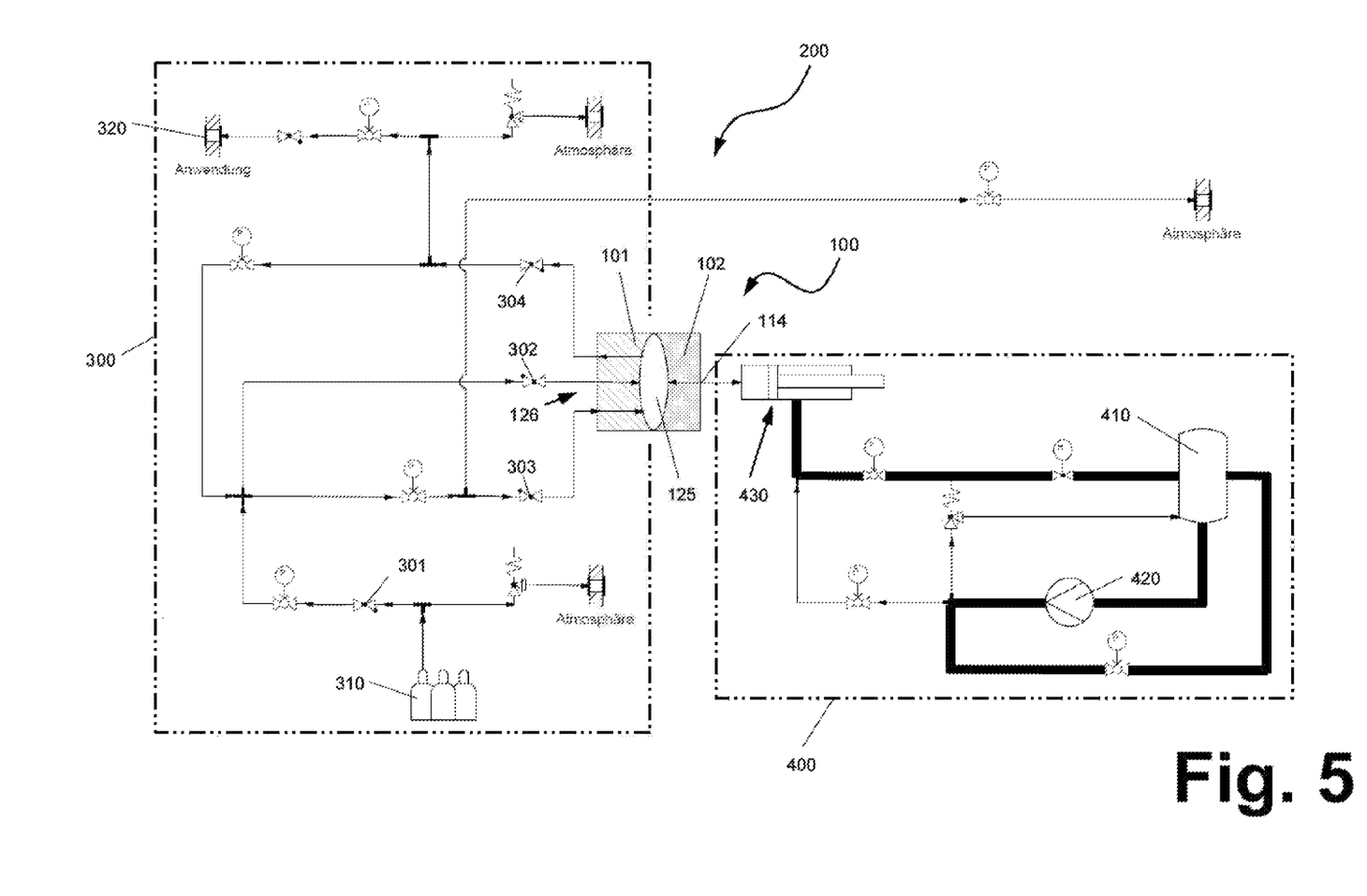
Figure 6:
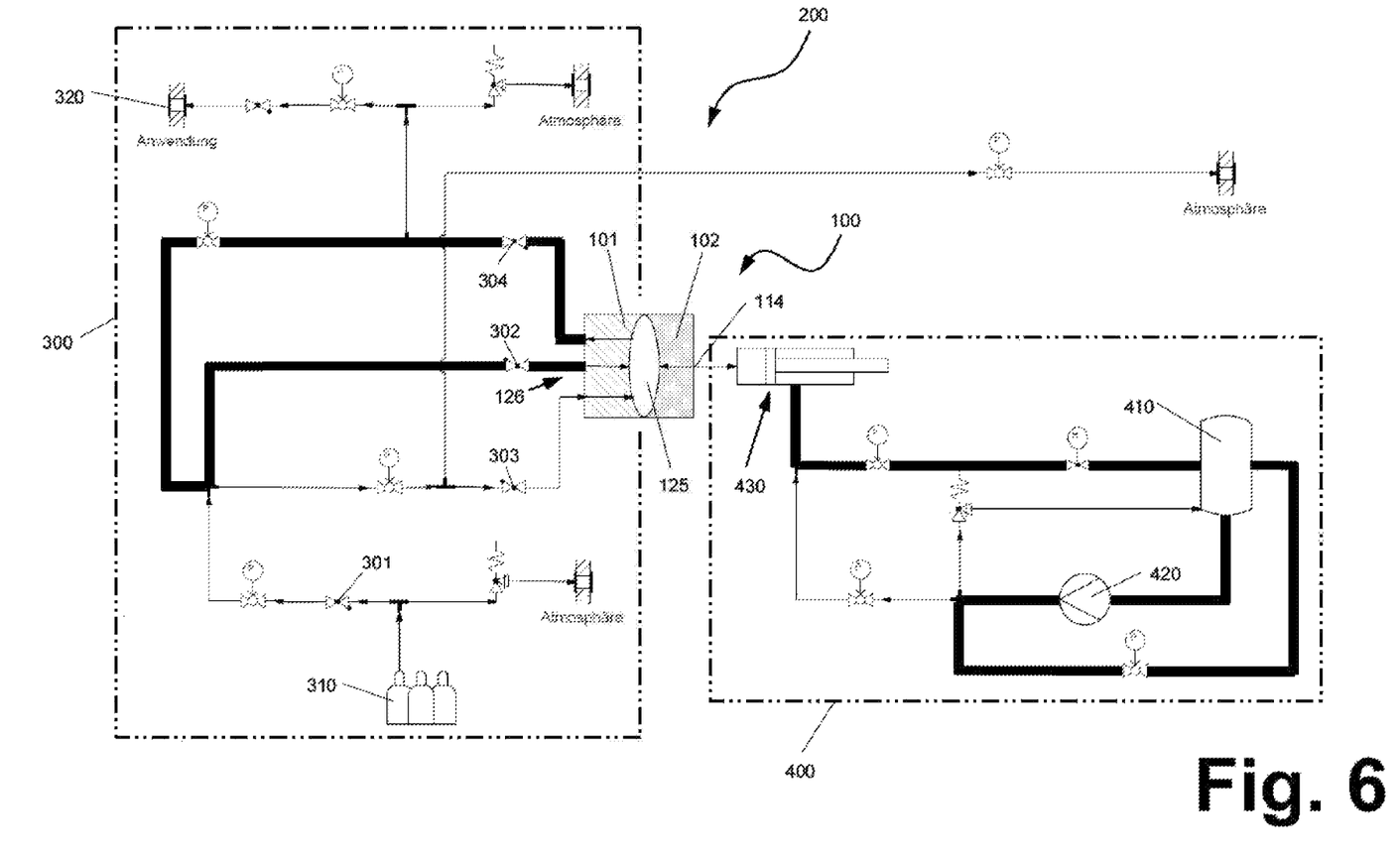

The compression sequence of the gas or gas mixture during operation of the compressor system 200 via the high-pressure compressor 100 proceeds in four cyclically recurring steps. FIG. 3 shows the filling of the high-pressure compressor 100 with a low pressure gas or gas mixture; following the filling of the compressor 100, the gas or gas mixture is compressed in a next step. FIG. 4 describes the stroke of the compressed gas or gas mixture into the high pressure gas or gas mixture supply 320. FIGS. 5 and 6 describe steps 1 and 2 for depressurizing the high-pressure compressor 100.

Filling the High-Pressure Compressor 100 (FIG. 3)

The compressor chamber 101 of the compressor assembly 120 is filled with a gas or gas mixture from the low pressure supply 310. For this purpose, the valve 301 from the low pressure supply 310 and a further valve 303 are opened so that a gas supply into the compressor chamber 101 takes place via the connection 126. Gas at a pressure of at least 10 bar is stored in the low pressure supply 310. The diaphragm 125 expands in the direction of the inner wall of the housing sleeve, and the pump 420 in the media circuit 400 for this step pumps the medium, which is still in the media chamber 102 of the pressure container 110, back into the media supply 410 for the compression medium.

A discharge line of the media circuit 400 from the cylinder of the piston 430 is opened and the higher pressure on the gas side causes the diaphragm 125 to be fully applied to the inner wall of the housing sleeve 111 as well as the piston of the piston 430 to move to its initial position.

Compressing the Gas or Gas Mixture and Stroke into the High Pressure Gas or Gas Mixture Supply (FIG. 4)

After the diaphragm 125 is brought completely into contact with the inner wall of the housing sleeve 111 of the high-pressure compressor 100, the valve 301 and the valve 302 are closed, and the valve 304 to the high pressure gas or gas mixture supply 320 is opened. In parallel, in the media circuit 400, the circuit back to the media supply 410 and the discharge line are closed. The medium is discharged from the media supply 410 by the pump 420, and supplied to the piston 430 downstream of the piston head. The incompressible media, which is located upstream of the piston head of the piston 430, is forced into the media chamber 102 of the high-pressure compressor 100 via the at least one connection 114, thereby bringing the diaphragm 125 into contact with the contour bar 121. This change in volume provides compression of the gas or gas mixture, resulting in an increase in pressure in the high pressure gas or gas mixture supply 320.

Depressurizing the High-Pressure Compressor 100 (FIG. 5)

The valve 304 to the high pressure gas or gas mixture supply 320 is closed. The line in the media circuit 400 and the discharge line, both of which lead back to the media supply 410 are opened. Due to the applied pressure on the gas side of the high-pressure compressor 100, the head of the piston 430 is pushed back a bit to its initial position, depending on the prevailing pressure, and the escaping medium is collected in the media supply 410.

Depressurizing the High-Pressure Compressor 100 (FIG. 6)

The discharge line to the media supply 410 remains open and the pump 420 continues to pump back into the media supply 410. The valve 302 for pressure discharge on the gas side is opened. Then, the valve 303 can be opened again and the valve 302 for pressure discharge can be closed to perform a new gas supply into the compressor chamber 101 of the high-pressure compressor 100.

Figure 7:
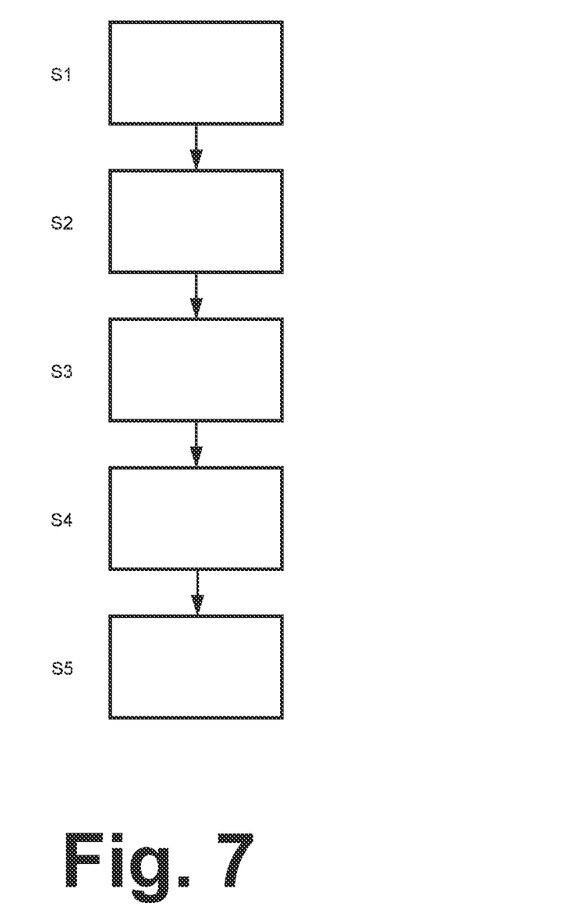
FIG. 7: a flow chart for high-pressure compression in a compressor system.

FIG. 7 shows a flow chart of the cyclically sequential steps S1-S5 for high pressure compression in a compressor system 200 comprising a high-pressure compressor 100.

In S1, the high-pressure compressor 100 is filled from the supply 310 (see FIG. 3). For this purpose, the corresponding valves are opened or closed.

In S2, the gas is compressed and the stroke into the high pressure gas or gas mixture supply 320 (see FIG. 4) from the high-pressure compressor 100 occurs.

In S3, a first intermediate step is performed to depressurize the high-pressure compressor 100 (see FIG. 5), closing the supply of gas from the high-pressure compressor 100 to the high pressure gas or gas mixture supply 320.

In S4, a second intermediate step is performed to depressurize the high-pressure compressor 100 (see FIG. 6), wherein depressurization occurs on the gas or gas mixture side 300 by opening the valve 302 and depressurizing.

In S5, a switchover for a new filling of the high-pressure compressor 100 takes place, for which the valve 303 is opened again and the valve 304 is closed for depressurization.

Valve 301, valve 302, valve 303, and valve 304 can be check valves.

The above sequence can always be repeated to achieve continuous high pressure compression for various applications or storage of the high compression gas or gas mixture.

LIST OF REFERENCE SIGNS 100 high-pressure compressor
101 compressor chamber 102 media chamber
110 pressure container
111 housing sleeve
112 flange plate
113-1 seal
113-2 seal
114-1 connection
114-2 connection
115 rod
116 nut
117 spacer disc
120 compressor assembly
121 contour bar
122-1 cone
122-2 cone
123-1 clamping nut
123-2 clamping nut
124-1 clamping piece
124-2 clamping piece
125 diaphragm
126 connection
127 bores
200 compressor system
300 gas or gas mixture circuit
301 valve
302 valve
303 valve
304 valve
310 low pressure gas or gas mixture supply
320 high pressure gas or gas mixture supply
400 media circuit
410 media supply
420 pump
430 piston

The invention claimed is:

1. A high-pressure compressor for compressing a gas or gas mixture, comprising:
at least one compressor assembly;
at least one media chamber;
at least one pressure container, the at least one pressure container surrounding the at least one media chamber and the at least one compressor assembly;
wherein the at least one compressor assembly comprises at least one contour bar and at least one diaphragm, which separates the at least one media chamber from at least one compressor chamber; and the at least one contour bar has at least one first connection for supply or discharge of a gas or gas mixture, which opens into the at least one compressor chamber;
wherein the at least one pressure container has at least one second connection for supply or discharge of a medium, which opens into the at least one media chamber; and
wherein the at least one diaphragm is deformable for compressing the gas or gas mixture which can be introduced into the at least one compressor chamber by introducing the medium into the at least one media chamber.

2. The high-pressure compressor of claim 1, wherein the at least one pressure container is cylindrical.

3. The high-pressure compressor of claim 1, wherein the at least one pressure container has at least one flange plate on an end face and at least one housing sleeve on a lateral surface.

4. The high-pressure compressor of claim 3, wherein the at least one contour bar is connected at at least one end to the at least one flange plate of the at least one pressure container.

5. The high-pressure compressor of claim 1, wherein the at least one diaphragm is formed as a hose section or as a hose segment.

6. The high-pressure compressor of claim 1, wherein the at least one diaphragm is arranged on and/or at the at least one contour bar.

7. The high-pressure compressor of claim 1, wherein the at least one diaphragm is in an area of at least two cones, the at least two cones arranged at end areas of the at least one contour bar inside the at least one pressure container, the at least one diaphragm is connected in a gas-tight manner via at least one clamping piece.

8. The high-pressure compressor of claim 1, wherein the at least one diaphragm is inflatable from a position abutting the at least one contour bar to an inner wall of the at least one pressure container.

9. The high-pressure compressor of claim 1, wherein the at least one diaphragm includes a polymerized material.

10. A compressor system for high pressure compression of a gas or gas mixture, comprising:
at least one high-pressure compressor according to claim 1;
a low pressure gas or gas mixture supply;
a high pressure gas or gas mixture supply;
a media supply;
conveying means for conveying a gas or gas mixture and a medium; and
control means for regulating a flow of the gas or gas mixture or the medium via one or more lines; and
wherein the high-pressure compressor comprises a pressure container surrounding at least one compressor chamber and at least one media chamber, wherein the at least one compressor chamber and the at least one media chamber in the at least one pressure container are separated from each other via at least one diaphragm, the high-pressure compressor comprises at least one first connection opening into the at least one compressor chamber, the at least one first connection is connected to the low pressure gas or gas mixture supply and the high pressure gas or gas mixture supply via the one or more lines as well as conveying or control means, so that a gas or gas mixture can be introduced from the low pressure gas or gas mixture supply into the at least one compressor chamber and from the at least one compressor chamber into the high pressure gas or gas mixture supply, the high-pressure compressor comprises at least one second connection opening into the at least one media chamber, the at least one second connection is connected to the media supply via the one or more lines as well as conveying and/or control means, so that a medium can be fed from the media supply via the at least one second connection into the at least one media chamber or from the at least one media chamber into the media supply, and the medium can be pressurized via conveying or control means, so that a deformation of the at least one diaphragm and a compression of the gas or gas mixture received in the at least one compressor chamber can be achieved, for which purpose the one or more lines to and from the low pressure gas or gas mixture supply, the high pressure gas or gas mixture supply and the media supply can be closed via the control means.

11. The compressor system of claim 10, wherein the medium used for compressing the gas or gas mixture has a lower compressibility than the gas or gas mixture.

* * * * *